Aug. 15, 1967  A. C. WERNER  3,336,180
DRY-CLEANABLE VINYL FOAM-FABRIC LAMINATE
Filed Feb. 14, 1964

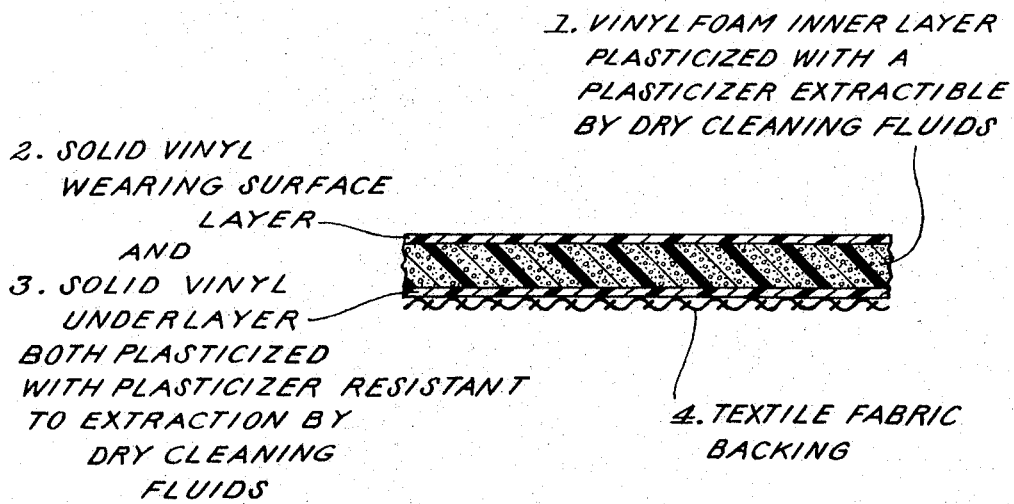

1. VINYL FOAM INNER LAYER PLASTICIZED WITH A PLASTICIZER EXTRACTIBLE BY DRY CLEANING FLUIDS
2. SOLID VINYL WEARING SURFACE LAYER
AND
3. SOLID VINYL UNDERLAYER
BOTH PLASTICIZED WITH PLASTICIZER RESISTANT TO EXTRACTION BY DRY CLEANING FLUIDS
4. TEXTILE FABRIC BACKING

*INVENTOR*
*ARNOLD C. WERNER*

BY *James J. Long*

*AGENT*

United States Patent Office 3,336,180
Patented Aug. 15, 1967

3,336,180
DRY-CLEANABLE VINYL FOAM-FABRIC
LAMINATE
Arnold C. Werner, Wallingford, Conn., assignor to
Uniroyal, Inc., a corporation of New Jersey
Filed Feb. 14, 1964, Ser. No. 345,043
3 Claims. (Cl. 161—88)

ABSTRACT OF THE DISCLOSURE

Leather-like vinyl foam-textile fabric laminates useful for clothing, etc., are rendered resistant to loss of hand and suppleness from dry-cleaning, by covering the vinyl foam layer, on each side, with a solid vinyl barrier layer plasticized with a plasticizer that is not extracted by perchloroethylene or other common dry cleaning solvents. Polymeric plasticizers such as glycol adipates are particularly suitable in the solid vinyl layers. Such non-extractable plasticizers would not be suitable for use in the vinyl foam layer itself because they do not provide the desired suppleness. The solid vinyl layers containing the non-extractable plasticizer protect the vinyl foam layer from extraction of the relatively soluble, monomeric plasticizers used in the vinyl foam layer to give the desired hand to the laminate.

This invention relates to a dry-cleanable vinyl foam laminate, and more particularly it relates to a material, such as a simulated leather suitable for garments and the like, which is a vinyl foam laminate that can be subjected to dry cleaning without damage.

Laminates comprising a thin layer of flexible vinyl foam on a textile fabric backing are in great demand, particularly in the form of a kind of simulated leather useful for clothing, upholstery, handbags, and similar goods. A method of making such laminates is described in U.S. Patent 2,964,799 issued to Roggi and Chartier on Dec. 20, 1960, and an improved laminate of this class is described in Belgian Patent 609,616, issued Oct. 26, 1961, to U.S. Rubber Co. While these laminates have many desirable qualities including pleasing hand and appearance, heat insulating value, and unexcelled durability, they unfortunately suffer from the fact that they cannot withstand dry cleaning. The principal object of this invention is to ameliorate this difficulty.

The invention provides a novel laminate that is resistant to dry cleaning, yet retains the desirable qualities of vinyl foam laminates, comprising a layer of vinyl foam having laminated to each of its faces a solid layer of vinyl containing a plasticizer that is substantially inextractable by perchloroethylene, and a textile fabric backing laminated to one of said solid vinyl layers.

In accordance with an important object of the invention, the ability to withstand repeated dry cleanings is imparted to the vinyl foam-textile fabric laminate without impairing its suppleness, drape or hand.

Further, the invention makes it possible to provide dry cleanability and soft feel in a vinyl foam laminate that can be made by desirable, convenient and economical methods.

Other objects and advantages of the invention will be apparent from the following detailed description, which is intended to be read with reference to the accompanying drawing, the single figure of which is a fragmentary cross-sectional view of a typical laminate of the invention.

Referring to the drawing, the laminate shown therein includes an interior layer 1 of vinyl foam, a surface or wear layer 2 of solid vinyl resin plasticized with a plasticizer that is substantially inextractable by perchloroethylene or other common dry cleaning fluids, an underlayer 3 of the same solid vinyl composition as the surface layer 2, and a textile fabric backing layer 4 which imparts strength to the product.

It is significant that although during the past years many millions of yards of conventional vinyl foam fabric laminates produced via the calender or plastisol techniques have been converted into a variety of winter type jackets, ski pants, snowsuits, hats, handbags, shoes, boots, etc., none of these are dry cleanable insofar as the present inventor is advised. If subjected to dry cleaning the item becomes stiff and practically useless as a result of exposure to the dry cleaning solvent (generally perchoroethylene).

If it is attempted to base the vinyl foam on a vinyl composition plasticized with a perchloroethylene-resistant plasticizer such as various polymeric plasticizers the results are unsatisfactory because the foam, in comparison to conventional vinyl foam made principally with monomeric plasticizers, lacks the necessary soft, supple hand. Furthermore, it is not feasible to try to compensate for this by using increased amounts of these expensive polymeric plasticizers, for economic reasons. Additionally such polymeric plasticizers are generally high in viscosity and therefore plastisols prepared from them require reduction for application through the use of volatile diluents (e.g., xylol, toluol). In a foam compound the presence of volatile diluent is most harmful to foam quality. The invention, in contrast to this, provides a vinyl foam fabric laminate that is resistant to dry cleaning solvents without any loss in the desired soft hand of such a product. By laminating a conventionally formulated vinyl foam possessing the necessary degree of softness between two lamina formulated with perchloroethylene resistant plasticizers it is possible to develop a dry cleanable laminate without suffering the disadvantages consequent to attempts to put such plasticizer in the foam itself.

Perchloroethylene-resistant plasticizers particularly suitable for use in the invention may be described as polymeric plasticizers having a relatively high molecular weight of at least 2000, preferably 5000 or more. Polyester plasticizers of this kind may be mentioned as particularly suitable, notably glycol adipates, sebacates, and the like, especially those derived from relatively short chain glycols or diols (2–4 carbon atoms). Such plasticizers frequently have a viscosity of at least about 100 poises, and preferably fall in the range of from 150 to 1000 or more poises (at 25° C.). The suitable plasticizers may be characterized by their ability to resist extraction by perchloroethylene from a vinyl film and by the ability of the film to resist shrinkage. Extraction values of less than 25%, preferably less than 15% are particularly desirable, as are shrinkage values of less than 8%, preferably not more than 6%. Polyesters based on mixed 1,4-butanediol and propylene glycol adipate, propylene glycol sebacate and 1,3-butanediol adipate may be mentioned as examples.

The lamina may be put together from cast, calendered, or extruded films in a wide variety of ways all resulting in a similar product. Thus the wearing surface layer 2 may be formed from plastisol or may be a calendered film, for example 3–15 mils thick, and may have a plasticizer content for example of 60 to 120 parts per 100 parts by weight of resin, depending on the application, e.g., jackets, hats, upholstery, etc. The surface may be printed, top coated and/or embossed if desired. The foam layer 1 likewise may be formed from plastisol or calendered, and typically is somewhat thicker, say 10–50 mils thick. Plasticizer level is typically 60 to 120 parts depending on the application, as in the wear layer. The foam structure may be produced by chemical or mechanical means. The foam layer provides the soft, warm, leather-like hand in the product. The underlayer 3 may be similar to the upper layer 2, and may be somewhat thinner, for example 2-8 mils. The textile fabric backing layer 4 may be laminated to the underside by heat and pressure, or with or without the aid of a plastisol, solution, or latex adhesive, or it may be wet laminated to the ungelled plastisol compound forming the layer 3 during fabrication.

As pointed out above, it is not practical to produce a laminate using the solvent resistant polymeric plasticizers in the foam compound. Instead, to develop the desired dry cleanable feature, the invention employs the concept of enclosing the conventionally formulated vinyl foam 1 between laminas 2 and 3 of solvent resistant films, one of which is the wear layer 2, the other being a special lamina 3 between the fabric 4 and foam 1. Both solvent resistant laminas 2 and 3 may be similarly formulated using the described perchloroethylene resistant plasticizers. The thicknesses of the solvent resistant laminas are sufficient for the normal wear resistant function of the outside lamina as well as sufficient to provide an impervious barrier to the dry cleaning solvents and prevent the extractable plasticizers in the foam from being leached out. The bottom protective film 3 is typically also sufficiently thick to serve, in addition to the latter function, as an adhesive between the foam and the fabric.

Typical recipes for skin and foam appear in Table I. These apply to calendered, extruded, cast (plastisol, organosol, solution) film and/or foam.

The conventional skin recipe shown in Table I is not employed in the invention, but is shown merely for purposes of comparison.

Plasticizer levels may be varied over a wide range, e.g., 10-250 phr. (parts by weight per 100 parts of resin) to develop the proper hand, as may the density of the foam through the use of varying levels of blowing agent. To duplicate the hand of the conventional product in a solvent resistant, dry cleanable system it is sometimes desirable to increase the plasticizer level (to compensate for the lower plasticizer efficiency of the special polymeric plasticizers) over that normally employed using primary and blends of primary and conventional polymeric plasticizers.

Due to the high viscosity of the special polymeric plasticizers it is generally desirable to prepare them as modified plastisols or organosols when employing these systems.

In the case of the solvent resistant plasticizers the essentially aliphatic type of hydrocarbons are not good solvents (for the polymeric plasticizers) and therefore aromatic solvents or blends of aromatic and aliphatic hydrocarbons are used for the purpose of viscosity reduction in plastisol type formulations. Of course calender produced films do not require the use of diluents.

In some cases deaeration of the solvent resistant compound may be desirable to assure a more impervious protective layer over and under the foam, i.e., one free of air bubbles or pin holes that might allow perchloroethylene to penetrate into the foam, extract plasticizer and be difficult to get rid of in the dry cleaning process, thus producing odor and a temporary overplasticizing effect in the foam. The desirability of deaeration will depend on how well air bubbles are eliminated during the coating process and the thickness of each protective layer.

Although calendered or extruded films can be used for the various lamina, it is also convenient to prepare laminates through the use of plastisols and organosols. The following is a typical laboratory procedure.

(1) Dry a suitable release surface, e.g., release paper (S. D. Warren Co.) in a forced air circulation oven, e.g., 400° F./1/2 min.

(2) Coat release paper with solvent resistant compound for wear layer, e.g., 1-30 mils thickness with a preferred range of 3-15 mils.

(3) Partially fuse wear layer, e.g., 300° F./2 min. A partial fusion will allow good adhesion of the foam layer to it and lower the tendency to blister as the diluent is driven off. See a study of this in Table II.

TABLE I.—TYPICAL COMPOUND RECIPES
[Parts by weight]

| | Foam Layer | Conventional Skin | Solvent Resistant Skin | |
|---|---|---|---|---|
| Polyvinyl chloride or copolymer resins, e.g. Marvinol ® VR50, VR53, VR56, VR22, VR31, VR42 | 100 | 100 | 100 | 100 |
| Monomeric plasticizer, e.g. di 2-ethyl hexyl phthalate, tricresyl phosphate; diisooctyl azelate, etc | 95 | 95 | | |
| Epoxydized soy bean oil e.g. EPO ®, G62 ® | 5 | 5 | 5 | 5 |
| Blowing agent e.g. azodicarbonamide, Celogen ® AZ; p,p' oxybis (benzenesulfonyl hydrazide), Celogen ® OT | 3 | | | |
| Pigments e.g.: | | | | |
| Titanium dioxide | 5 | 10 | 10 | 12.5 |
| Lamp black | 1 | 2 | 2 | 2.5 |
| Stabilizer, e.g. barium, cadmium, zinc organic complex, Mark ® KCB, BC110 | | 3 | 3 | 3 |
| Perchloroethylene resistant plasticizer [1] | | | 100 | 150 |
| Volatile diluent, e.g. toluol, xylol | | | 25 | 25 |
| Activator-Stabilizer, e.g. dibasic lead phthalate, Dythal ®; organic zinc complex, ABC-2 | 3 | | | |

[1] Polyester of adipic acid with 1,4-butanediol and propylene glycol in 2:1 ratio; mol wt. about 6,500; viscosity about 900 poises at 25° C.

TABLE II.—SKIN COAT FUSION STUDY
[Release paper was coated with solvent resistant skin compound as shown in Table I and fused as follows]

| Sample deaerated | No | No | Yes | No | No | Yes. |
|---|---|---|---|---|---|---|
| Oven temperature, °F | 400 | 400 | 300 | 300 | 300 | 300. |
| Oven time, minutes | 1 | 1 | 1 | 2 | 2 | 5. |
| Plate [1] | Hot | Cold | Hot | Hot | Cold | Cold. |
| Film surface | Very rough | Some bubbles | Some bubbles | Some bubbles | Smooth | Smooth. |
| Fusion | Good | Good | Adequate | Adequate | Adequate | Adequate. |

[1] Coated paper placed on thin steel plate at room temperature, "cold" or at oven temperature, "hot."

These data show that too rapid a heat build-up in the vinyl film results in a blistering of the film. A more gradual heat exposure allows the diluent to leave the film intact as it is driven off. This may be done by lowering the oven air temperature and placing the paper-film laminate on a plate acting as a heat sink. Fusion is adequate for subsequent rolling and coating, and need not be complete.

(4) Coat conventionally formulated foam compound onto partially fused skin compound above, e.g., as expanded 5–100 mils with a preferred range of 10–50 mils.

(5) Fuse or partially fuse above foam coat, but do not activate blowing by maintaining good temperature-time control, e.g. 400° F./1 min.

(6) Coat solvent resistant compound onto unfoamed compound, e.g., 4 mils wet.

(7) Laminate fabric to wet plastisol in #6.

(8) Fuse and foam entire laminate, e.g. 400° F./4 min.

(9) Partially cool and strip away release paper.

Subsequent operations can include embossing, printing, top coating, etc., if desired.

Although the above illustration uses plastisols and modified plastisols or organosols the construction may be formed from film and sheeting produced on a calender, extruder, solution casting, and combination of these.

A number of laminates prepared as described were evaluated for dry cleanability by simulating the dry cleaning process in the laboratory. This involved tumbling small samples in perchloroethylene, carbon tetrachloride, and naphtha; drying with heat; weighing and measuring the test samples to determine weight loss and shrinkage. Various test results are shown in Table III.

low molecular weight, and a viscosity of about 50 poises at 25° C.; specific gravity 1.08. Plasticizer C is poly(1,3-butanediol adipate), viscosity 170 poises, specific gravity 1.125. Such plasticizers are commercially available under such trade names as "Paraplex G–54," "Polycin 11," "Admex 760," "Santicizer 411," and "Paraplex G–25." The data in Table III show that the construction based on compounds designed for the present purpose to be very significantly superior to conventional systems, which lose their flexibility and shrink to a considerable extent as a result of even a minimum of exposure to simulated dry cleaning. Another simple test to determine the suitability of any given plasticizer may be based on extraction studies of simple films prepared with the plasticizer. Table IV shows the results of extraction studies of unsupported films in perchloroethylene. Weight loss on the basis of the total plasticizer and stabilizer available for extraction, and film shrinkage were determined after perchloroethylene exposures of 15 and 30 minutes. In this test, a plasticizer which has a weight loss after 15 minutes exposure less than 25%, preferably less than 15%, and a shrinkage less than 8%, preferably less than 6%, is considered suitable for use in the invention.

TABLE IV.—EXTRACTION STUDIES ON SIMPLE FILMS IN PERCHLOROETHYLENE

| Plasticizer | DOP | B | D | E | A | A | C |
|---|---|---|---|---|---|---|---|
| Plasticizer level, phr | 100 | 100 | 100 | 100 | 100 | 150 | 100 |
| Exposure Time, 15 minutes: | | | | | | | |
| Weight loss, percent [1] | 69 | 30 | 20 | 22 | 11 | 12 | 13 |
| Shrinkage, percent [2] | 20 | 9 | 6 | 7 | 3 | 4 | 5 |
| Exposure Time, 30 minutes: | | | | | | | |
| Weight loss, percent | 75 | 36 | 26 | 34 | 16 | 15 | 17 |
| Shrinkage, percent | 20 | 10 | 8 | 10 | 5 | 6 | 5 |

[1] Calculated as percent of total plasticizer available for extraction.
[2] Average of two dimensions; all films between .020″ and .025″ in thickness.

Plasticizer D is poly(propylene sebacate), molecular weight 8,000, viscosity 2200 poises, specific gravity 1.06. Plasticizer E is likewise a polymeric plasticizer, viscosity 94 poises, specific gravity 1.10. It will be seen from consideration of the data in Tables III and IV that plasticizers A and C are particularly suitable for use in the invention; less suitable are D and E. On the other hand, DOP and B are not suitable.

TABLE III.—SIMULATED DRY CLEANING OF LAMINATES IN VARIOUS CLEANING SOLVENTS

| Plasticizer [1] | DOP | "A" | DOP | "B" | "A" | "A" | "C" |
|---|---|---|---|---|---|---|---|
| Plasticizer level, phr | 80 | 120 | 100 | 100 | 100 | 150 | 100 |
| Solvent | Perchloroethylene | | Perchloroethylene | | | | |
| Exposure Time | 0 hours | | ½ hour | | | | |
| Flexibility [2] | 10 | 10 | 4 | 4 | 9 | 9 | 8 |
| Shrinkage, percent [3] | 0 | 0 | 10 | 5 | 5 | 5 | 7 |
| Exposure Time | 1 hour | | 1 hour | | | | |
| Flexibility [2] | 4 | 9 | 2 | 3 | 7 | 8 | 7 |
| Shrinkage, percent [3] | 10 | 2 | 10 | 6 | 8 | 5 | 5 |
| Solvent | | | Carbon Tetrachloride | | | | |
| Exposure Time | 2 hours | | ½ hour | | | | |
| Flexibility [2] | 2 | 8 | 4 | 4 | 9 | 9 | 8 |
| Shrinkage, percent [3] | 14 | 2 | 9 | 3 | 3 | 3 | 3 |
| Solvent | | | Naphtha | | | | |
| Exposure Time | 17 hours | | ½ hour | | | | |
| Flexibility [2] | 0 | 6 | 4 | 6 | 9 | 9 | 9 |
| Shrinkage, percent [3] | 15 | 7 | 7 | 2 | 1 | 1 | 2 |

[1] Plasticizer used in upper and lower solid vinyl lamina; foam compound conventional formulation; see Table I for recipes.
[2] Flexibility Rating.—10=original flexibility; 8=slight loss in flexibility; 6=some loss in flexibility; 4=considerable loss in flexibility; 2=complete loss in flexibility.
[3] Average of two dimensions.

The plasticizer identified as DOP in Table III is "dioctyl" phthalate, or di-2-ethylhexyl phthalate. Plasticizer A is the polyester plasticizer identified in Table I. Plasticizer B is similarly a polyester, but has a relatively Those plasticizers classified as less suitable can be used in conjunction with the more preferred plasticizers to take advantage of other properties they may possess.

It will be noted that the film data in Table IV correlate with the laminate flexibility and shrinkage data in Table III after simulated dry cleaning.

The polymeric plasticizers which are operable in the invention are those characterized by high molecular weight, e.g., 2,000 to 20,000, preferably, 4,000 to 10,000, and specified alkyl chain lengths, i.e., glycols and dicarboxylic acids selected from shorter carbon chain types, e.g., 2 to 5 carbon atoms in the glycols and diols, and 4 to 10 carbon atoms in the acid chain.

The invention thus provides for the encapsulation of any foam susceptible to the deleterious effects of dry cleaning solvents, between films that are relatively impervious and unaffected by these same solvents to the extent that during the life time of the article it maintains a satisfactory degree of utility. Examples of foams other than the PVC used here are urethane and rubber. Examples of protective films other than plasticized PVC, are possibly cast from a solution; thermoset films such as polyesters; other vinyl polymers such as fluorides; and other polymers such as cellulose acetate and acrylics.

Although the fabric is generally part of this construction it need not be, its function being solely for strength. The fabric may be left out, or it may be cotton, fiberglass, synthetics, etc. and it may be at other positions in the laminate other than on one side, e.g., it may be between the foam and lower barrier film.

The foam layer of the present laminate typically comprises a vinyl resin, preferably a vinyl chloride resin such as polyvinyl chloride homopolymer or equivalent copolymers of vinyl chloride with such copolymerizable monomers as vinyl acetate, vinylidene chloride, diethyl maleate and the like.

Foaming may be accomplished by chemical blowing agents or mechanical means, e.g., Oaks Foamer.

The solid outer layers of the laminate may be based on resins of this kind also, plasticized with the inextractable plasticizer, as described. The plasticizer in the foam layer may be any conventional monomeric and/or polymeric plasticizer for vinyl resin, but differs from the plasticizer in the solid outer layers in that it is extractable with perchloroethylene or other common dry cleaning fluids.

Having thus described my invention, what I claim and desire to protect by Letters Patent is:

1. A leather-like material having a soft, supple hand that is resistant to dry cleaning fluids comprising an inner layer of vinyl chloride resin flexible foam plasticized with a monomeric plasticizer that is normally extractable by dry cleaning fluids, said inner layer being covered on each side by an integrally united layer of solid vinyl resin plasticized with a polymeric plasticizer that is substantially inextractable by dry cleaning fluids, and a textile fabric backing united to the outer surface of one of said solid layers whereby the said inner foam layer is protected from attack by dry cleaning fluids and the resulting laminate can be dry cleaned without losing its supple hand.

2. A laminate comprising a layer of soft, flexible vinyl chloride foam plasticized with a monomeric plasticizer that is extractable with perchloroethylene, a layer of solid vinyl chloride resin integrally united to each face of said foam layer, said solid vinyl resin layer being plasticized with a polymeric plasticizer that is resistant to extraction with perchloroethylene, and a layer of textile fabric backing united to one outer surface of said laminate, whereby the foam layer is protected from extraction of the said monomeric plasticizer when the laminate is dry cleaned with perchloroethylene and the laminate retains its suppleness and soft hand..

3. A laminate as in claim 2 in which the said plasticizer that is resistant to extraction with perchloroethylene is a polyester of a diol having from 2 to 5 carbon atoms with a saturated dicarboxylic acid having from 4 to 10 carbon atoms in the chain, said polyester having a molecular weight of from 2,000 to 20,000.

References Cited

UNITED STATES PATENTS 3,216,068 11/1965 Williams _____ 161—119 X
3,220,901 11/1965 Holmstrom et al. _____ 156—79

OTHER REFERENCES

W. S. Penn: PVC Technology, 1st ed. 1962, pp. 75, 85, 86, 114, 116–118.

ALEXANDER WYMAN, *Primary Examiner.*

M. A. LITMAN, *Assistant Examiner.*